(12) United States Patent
Son et al.

(10) Patent No.: US 8,724,064 B2
(45) Date of Patent: May 13, 2014

(54) FRINGE FIELD SWITCHING MODE LIQUID CRYSTAL DISPLAY DEVICE AND METHOD OF FABRICATING THE SAME

(75) Inventors: Ock Soo Son, Seoul (KR); Won Hee Lee, Icheon-Si (KR); Soo Young Choi, Icheon-Si (KR); Dong Hae Suh, Seoul (KR)

(73) Assignee: Hydis Technologies Co., Ltd., Icheon-Si (KR)

( * ) Notice: Subject to any disclaimer, the term of this patent is extended or adjusted under 35 U.S.C. 154(b) by 491 days.

(21) Appl. No.: 12/831,793

(22) Filed: Jul. 7, 2010

(65) Prior Publication Data

US 2011/0109861 A1    May 12, 2011

(30) Foreign Application Priority Data

Nov. 12, 2009 (KR) .................. 10-2009-0109177

(51) Int. Cl.
*G02F 1/1335* (2006.01)
*G02F 1/1343* (2006.01)

(52) U.S. Cl.
USPC .......................................... 349/141; 349/113

(58) Field of Classification Search
USPC .......................................... 349/111, 113, 141
See application file for complete search history.

(56) References Cited

U.S. PATENT DOCUMENTS

| 6,256,081 | B1 | 7/2001 | Lee et al. |
| 6,266,118 | B1 | 7/2001 | Lee et al. |
| 7,345,728 | B2 | 3/2008 | Lee et al. |
| 2005/0046763 | A1* | 3/2005 | Ono et al. ............... 349/39 |
| 2006/0256249 | A1* | 11/2006 | Nagano et al. ........... 349/43 |
| 2008/0204640 | A1* | 8/2008 | Wada ...................... 349/114 |
| 2009/0195723 | A1* | 8/2009 | Araki et al. .............. 349/43 |

FOREIGN PATENT DOCUMENTS

| KR | 100653474 B1 | 11/2006 |
| KR | 100849599 B1 | 7/2008 |

* cited by examiner

*Primary Examiner* — Jessica M Merlin
(74) *Attorney, Agent, or Firm* — The Webb Law Firm (57) ABSTRACT

Provided is a liquid crystal display including a transparent pixel electrode and a transparent common electrode in a pixel region to drive liquid crystals. The transparent common electrode includes a plurality of slits and is configured to open at least a portion of a switching device to connect unit pixels, the slits have an angle of 5 to 10° with respect to a gate line, and a rubbing direction of a liquid crystal layer is substantially parallel to a gate direction. Therefore, it is possible to provide the liquid crystal display capable of removing factors decreasing an aperture ratio, preventing light from leaking, and further improving internal reflection.

10 Claims, 13 Drawing Sheets

Embodiment of Invention

Korean Patent Registration No. 849599

FIG. 8

Embodiment of Invention

Conventional Art

FIG. 9

FRINGE FIELD SWITCHING MODE LIQUID CRYSTAL DISPLAY DEVICE AND METHOD OF FABRICATING THE SAME

CROSS-REFERENCE TO RELATED APPLICATION

This application claims priority to and the benefit of Korean Patent Application No. 2009-109177, filed on Nov. 12, 2009, the disclosure of which is incorporated herein by reference in its entirety.

BACKGROUND

1. Field of the Invention

The present invention relates to a liquid crystal display device (LCD) and a method of fabricating the same, and more particularly, to an LCD and a method of fabricating the same that are capable of removing factors decreasing an aperture ratio, preventing light from leaking, and further improving internal reflection.

2. Discussion of Related Art

In general, a fringe field switching (FFS) mode LCD has been proposed to improve a low aperture ratio and transmittance of an in-plane switching (IPS) mode LCD.

The FFS mode LCD includes a common electrode (counter electrode) and a pixel electrode which are formed of a transparent conductive material to increase an aperture ratio and transmittance in comparison with the IPS mode LCD. In addition, a gap between the common electrode and the pixel electrode is smaller than a gap between upper and lower glass substrates so that a fringe field can be formed between the common electrode and the pixel electrode. As a result, all liquid crystal molecules existing on the electrodes are also operated to provide better transmittance. A conventional art of the FFS mode LCD is disclosed in, for example, U.S. Pat. Nos. 6,256,081 and 6,266,118, Korean Patent Registration No. 653474, etc., which are filed by and issued to the applicant.

The conventional FFS mode LCD has problems of cross-talk generation between a data line and a pixel electrode, and the disclination due to abnormal operation of liquid crystal at an end of slits of the pixel electrode. A black matrix (BM) covers a substantial portion affected by the cross-talk and disclination, which decreases an aperture ratio. Moreover, as higher resolution is requested, the size of a unit pixel should be reduced. But, the size of a contact hole must not be less than certain level and thus the aperture ratio may be reduced.

In order to solve the problems, Korean Patent Registration No. 849599 has proposed a structure in which a contact hole is removed to increase an aperture ratio and lower transmittance on a data line to a minimum, and increase liquid crystal efficiency around the data line to a maximum. However, since the above structure provides the maximum liquid crystal efficiency around the data line, an electric field adjacent to the data line may affect liquid crystals of a pixel adjacent thereto to cause color mixing, and thus, a minimum black matrix is still needed. Moreover, because rubbing is performed at a predetermined angle with respect to the data line, light leakage due to rubbing failures is caused around one side of the data line, and it is difficult to increase external visibility using internal reflection.

Therefore, in order to remove factors of decreasing an aperture ratio of the conventional FFS mode LCD, reduce light leakage, and improve internal reflection, new type of LCD is still required.

SUMMARY OF THE INVENTION

The present invention is directed to an FFS mode LCD and a method of fabricating the same that are capable of forming a pixel region without a contact hole through a relatively simple process, and removing a dark region and disclination to a maximum to increase an aperture ratio.

The present invention is also directed to an FFS mode LCD and a method of fabricating the same that are capable of increasing an aperture ratio, preventing light from leaking, and obtaining internal reflection.

According to an aspect of the present invention, there is provided a fringe field switching mode (FFS mode) liquid crystal display device (LCD) including a lower substrate, an upper substrate, and a liquid crystal layer disposed between the substrates, the lower substrate including unit pixel regions defined by gate lines and data lines formed to intersect each other and switching devices disposed on intersections of the gate and data lines. The LCD includes: a transparent pixel electrode disposed in the pixel region, and a transparent common electrode disposed on the transparent pixel electrode and spaced apart from the transparent pixel electrode with an insulating layer interposed therebetween, and having a plurality of slits formed in the pixel region, to adjust optical transmittance by applying a voltage to the liquid crystal layer. Here, the slits are disposed to form an angle of 5 to 10° with respect to the gate line, a rubbing direction of the liquid crystal layer is substantially parallel to a gate direction, and a drain electrode of the switching device is electrically connected to the transparent pixel electrode.

Here, the LCD may further include a reflective structure formed of the same material as the gate line and disposed under the data line with an insulating layer disposed therebetween.

Meanwhile, the reflective structure may have a width larger than that of the data line.

In addition, the angle of the slits may be determined such that adjacent pixel regions are axisymmetrically disposed to differentiate rotational directions upon driving of liquid crystals, and the LCD may further include a transparent auxiliary electrode formed under the transparent pixel electrode.

In addition, the transparent common electrode may open at least a portion of the switching device. It is possible for the transparent common electrode to totally cover the switching device.

According to another aspect of the present invention, there is provided a method of fabricating a fringe field switching mode (FFS mode) liquid crystal display device (LCD) including a lower substrate, an upper substrate, and a liquid crystal layer disposed between the substrates, the lower substrate including unit pixel regions defined by gate lines and data lines formed to intersect each other and switching devices disposed on intersections of the gate and data lines. The method includes: forming a gate line; forming a gate insulating layer and an active layer on the gate line; forming a transparent pixel electrode in the pixel region; forming a drain electrode and a data line on the resultant structure having the transparent pixel electrode, wherein a portion of the drain electrode is electrically connected to a portion of the pixel electrode; and forming a transparent common electrode disposed on and spaced apart from the transparent pixel electrode with an insulating layer interposed therebetween, having a plurality of slits in the pixel region, and configured to open at least a portion of the switching device.

Here, the slits may be disposed to form an angle of 5 to 10° with respect to the gate line, and a rubbing direction of the liquid crystal layer may be substantially parallel to a gate direction.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

An LCD in accordance with an exemplary embodiment of the present invention includes a lower substrate, an upper substrate, and a liquid crystal layer disposed between the upper and lower layers. The lower substrate includes a plurality of pixel regions defined by electrodes formed to intersect each other to apply a voltage to the liquid crystal layer.

Figure 1:
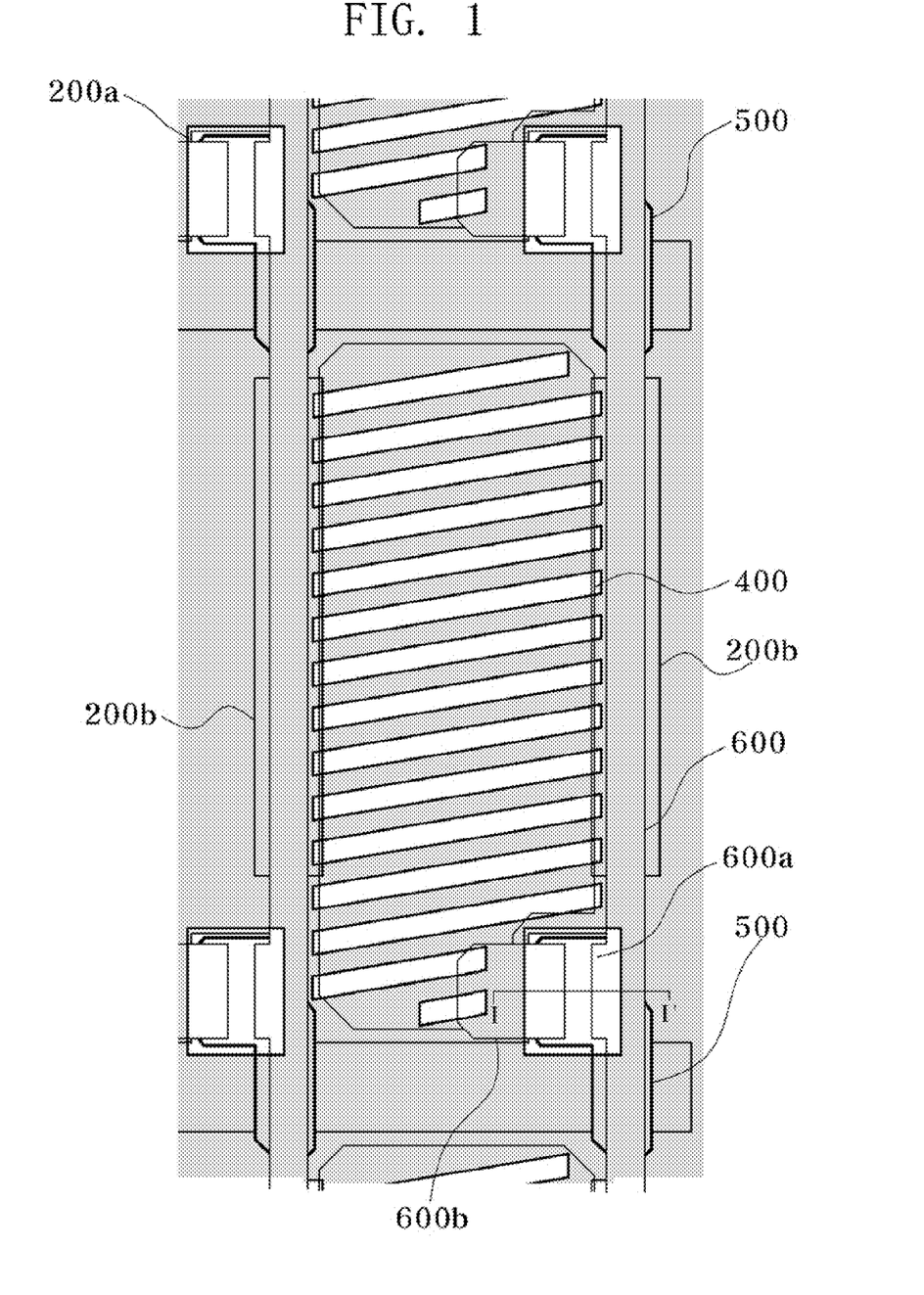
FIG. 1 is a plan view showing a portion of a pixel region formed at a lower substrate of an FFS mode LCD in accordance with an exemplary embodiment of the present invention.
Figure 2:
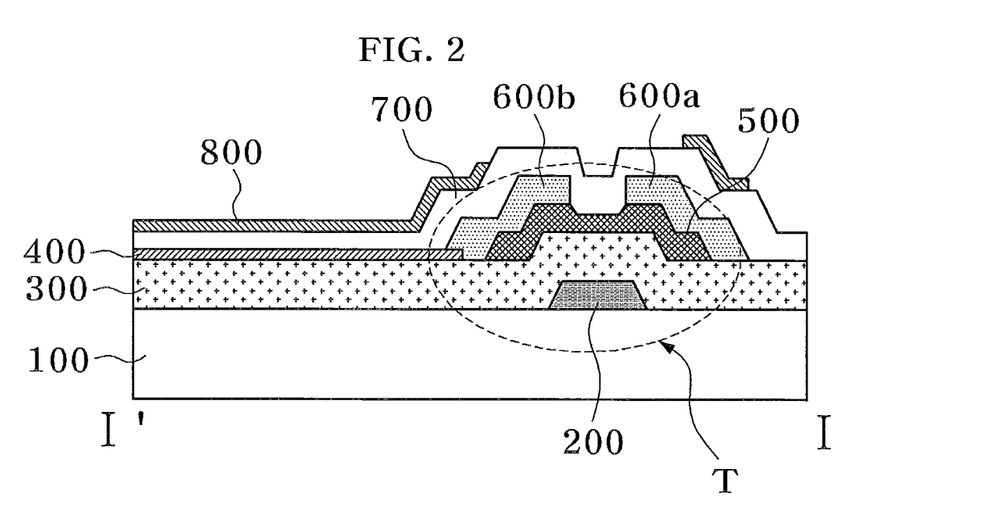
FIG. 2 is a cross-sectional view taken along line I-I' of FIG. 1.

FIG. 1 is a plan view showing a portion of a pixel region formed at a lower substrate of an FFS mode LCD in accordance with an exemplary embodiment of the present invention, FIG. 2 is a cross-sectional view taken along line I-I' of FIG. 1, and FIGS. 3A to 3E are cross-sectional views sequentially showing steps of forming and overlapping respective layers.

A lower substrate 100 includes gate lines 200a and data lines 600 formed of an opaque metal and arrayed to intersect each other to form unit pixels. A transparent pixel electrode 400 and a transparent common electrode 800 are disposed in a unit pixel region with an insulating layer 700 interposed therebetween. The transparent pixel electrode 400 is disposed on the same layer as the data line 600, for example, in a plate shape, so that a drain electrode 600b of a switching device overlaps at least a portion of the transparent pixel electrode 400 and is electrically connected thereto. In this structure, a process of forming a contact hole can be removed to solve a problem that a pixel size cannot be reduced due to the contact hole forming process. In addition, this structure enables high resolution to be implemented.

The transparent common electrode 800 has a plurality of slits formed by patterning a transparent conductive layer deposited on the insulating layer 700 and overlaps the transparent pixel electrode 400 in a predetermined region.

An active pattern 500 in which an a-Si layer and an n+ a-Si layer are sequentially deposited, and source and drain electrodes 600a and 600b are provided with a gate insulating layer 300 interposed therebetween on the gate line 200a to form a thin film transistor (TFT) T. The drain electrode 600b is electrically connected to the transparent pixel electrode 400 to apply a data signal to the unit pixel.

Meanwhile, together with the formation of the gate line 200a, a reflective structure 200b formed of the same material as the gate line is formed under the data line 600. While the reflective structure 200b may be formed of a material different from the material of the gate line 200a, it is preferable that the reflective structure 200b is formed of the same material as the gate line 200a for the convenience of process simplicity. The reflective structure 200b is configured to improve internal reflection, functions of which will be described below.

Meanwhile, the transparent common electrode 800 includes a plurality of slits formed in the pixel region and opens at least a portion of the switching device. That is, when the unit pixel regions are formed in a matrix, the unit pixel regions are entirely connected by the transparent common electrodes 800 and partially open the slits and the switching device, thereby reducing the entire resistance of the common electrodes.

Meanwhile, the slits are configured to form an angle of 5 to 10 degrees with respect to the gate line, and a rubbing direction of a liquid crystal layer is formed to be substantially parallel to the gate line direction. Since the rubbing direction of the liquid crystal layer is substantially parallel to the gate line direction, it is possible to reduce light leakage and disclination. Axes of polarizers attached to the upper and lower substrates may be implemented to be the same as the rubbing direction of the liquid crystal layer.

Meanwhile, the upper substrate includes a color filter (not shown) for representing colors of a screen corresponding to the pixel regions formed on the lower substrate 100. A black matrix on the data line 600 may be removed or partially remained.

Next, a method of fabricating an FFS mode LCD in accordance with an exemplary embodiment of the present invention will be described in detail with reference to FIGS. 1, 2, and 3A to 3E.

Figure 3A:
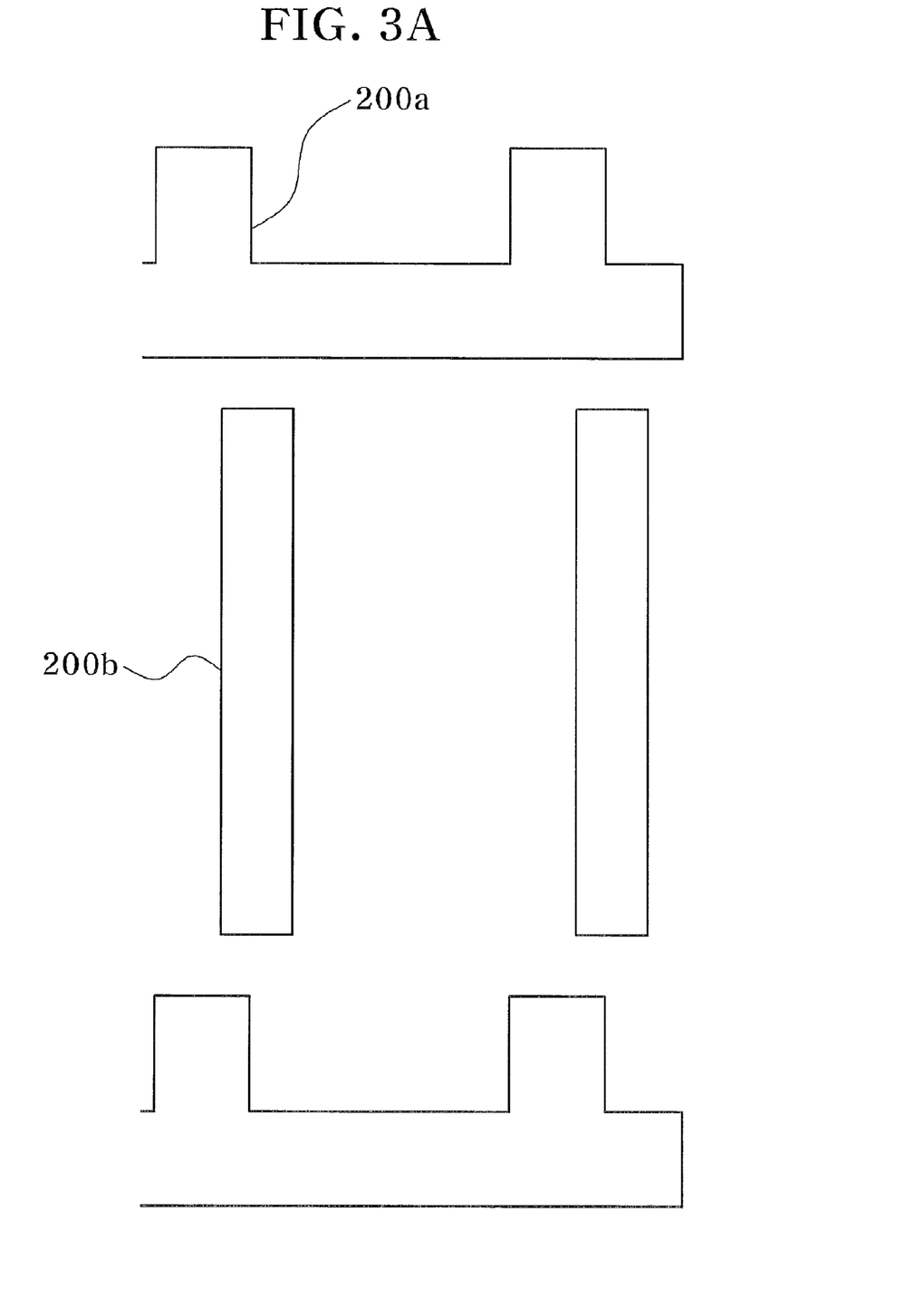
FIGS. 3A to 3E are cross-sectional views sequentially showing steps of forming and overlapping respective layers.

A gate line 200a including a gate electrode is formed on a lower substrate 100, and simultaneously, a reflective structure 200b is formed. That is, the gate line 200a including the gate electrode, and the reflective structure 200b are formed on the lower substrate 100 corresponding to a formation part of a TFT T through deposition of an opaque metal layer and patterning thereof on the lower substrate 100. The reflective structure 200b is formed under a data line.

Figure 3B:
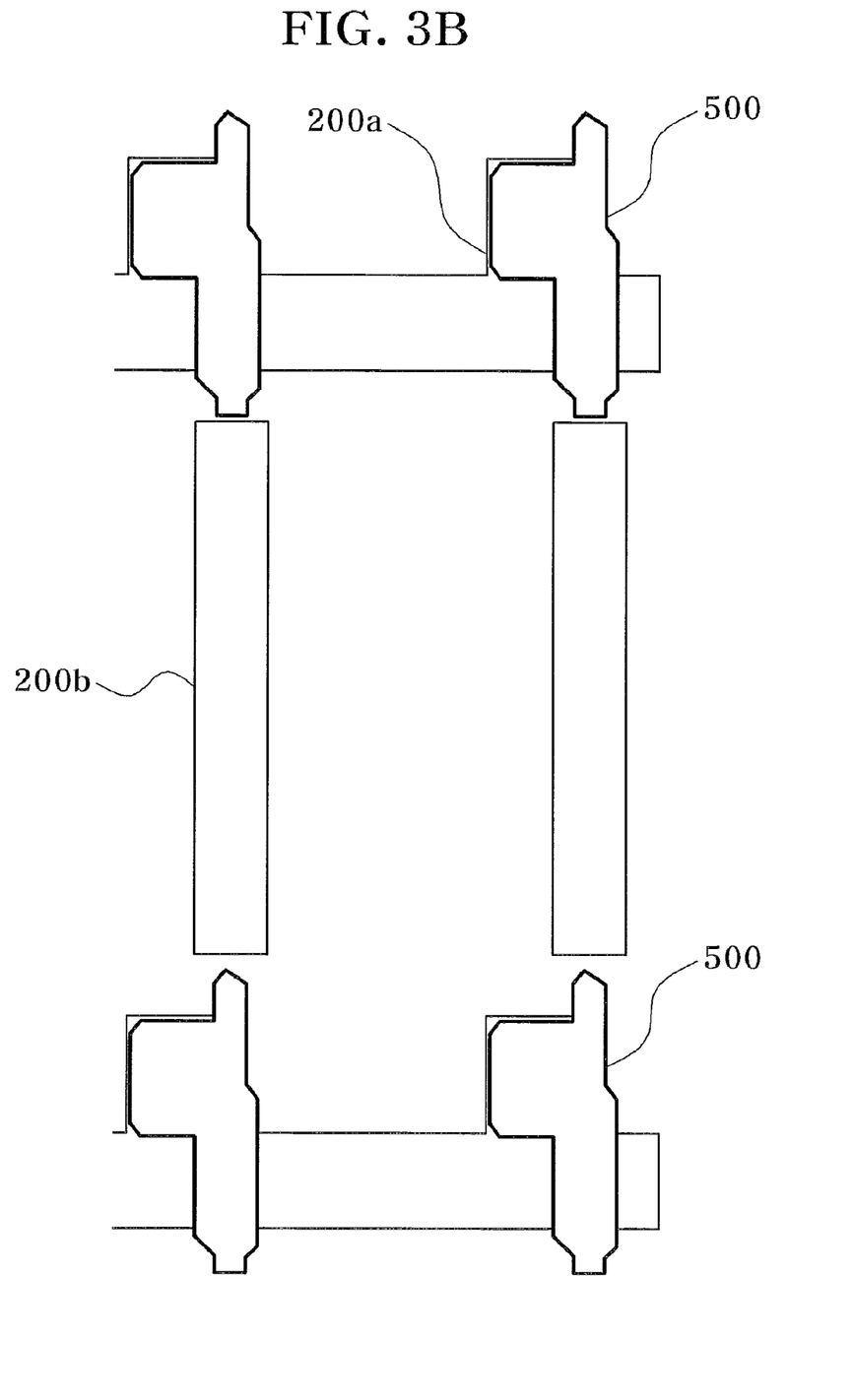

Next, a gate insulating layer 300 is deposited on the entire surface of the lower substrate 100 to cover the gate line 200a and the reflective structure 200b, and an a-Si layer and an n+ a-Si layer are sequentially deposited on the gate insulating layer 300. In this state, the layers are patterned to form an active layer 500 on the gate insulating layer 300 on the gate electrode.

Figure 3C:
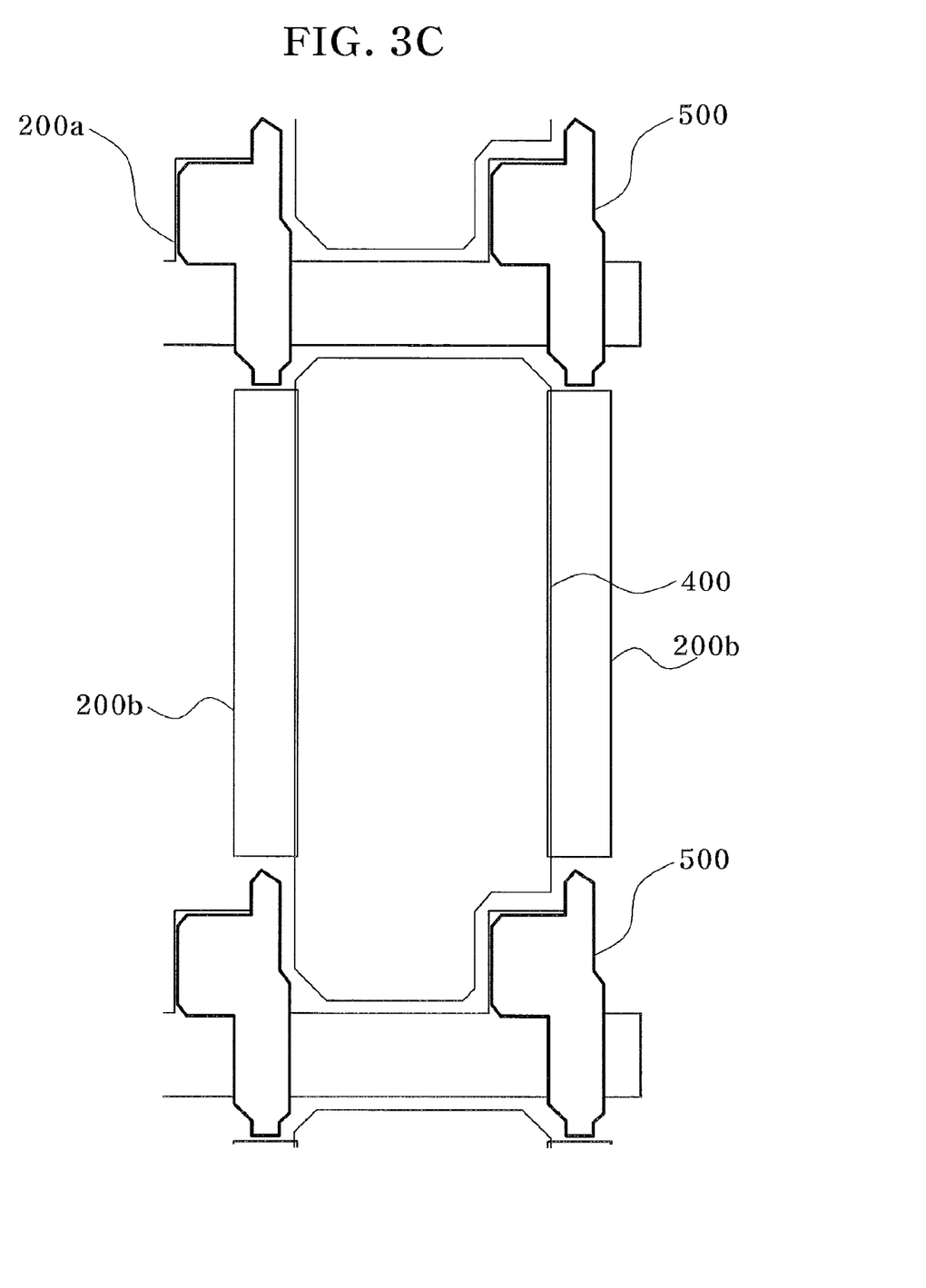

Next, a plate type transparent pixel electrode 400 is formed in each pixel region on the resultant substrate through deposition of a transparent conductive layer and patterning thereof.

Figure 3D:
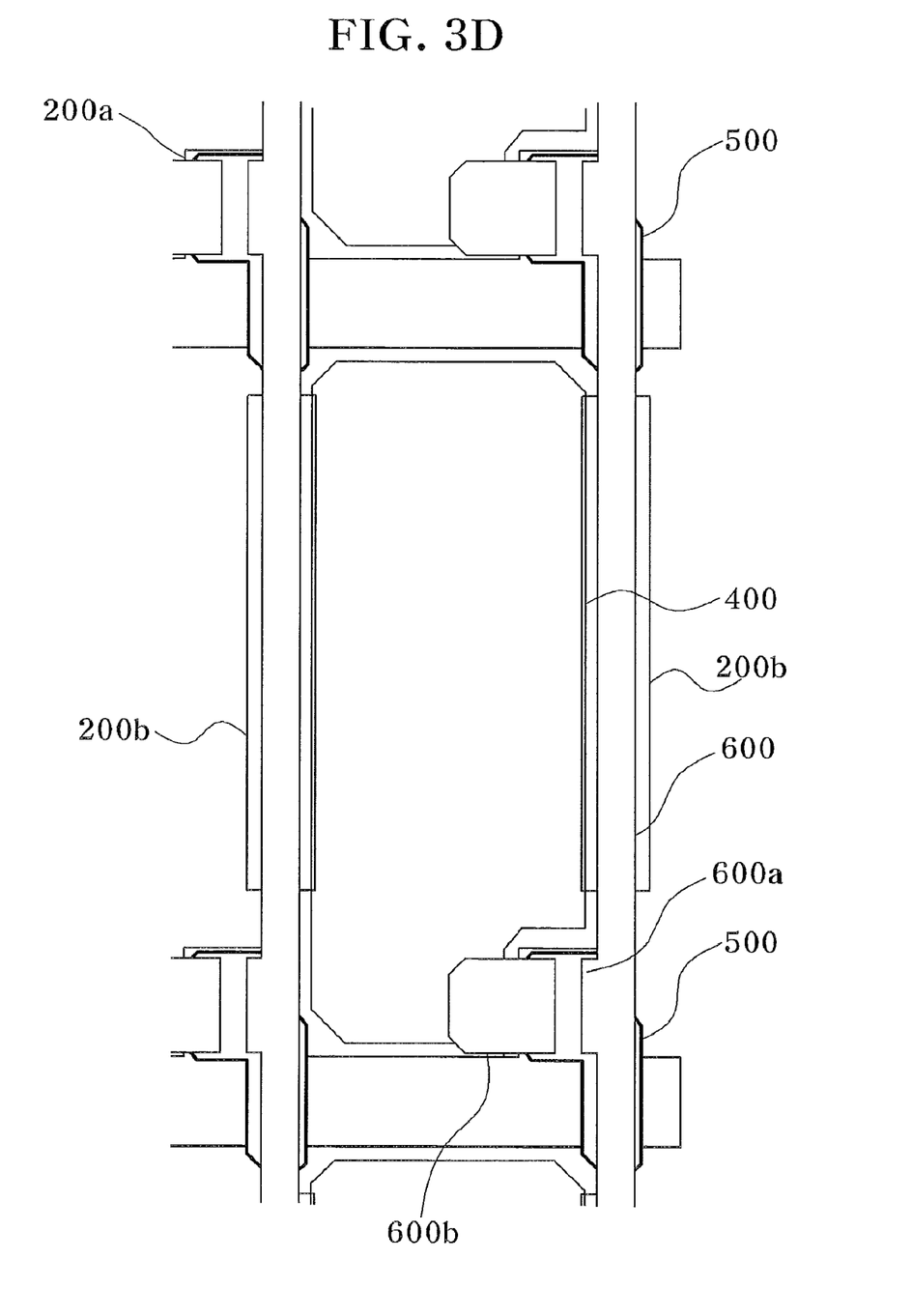

Next, a metal layer for source and drain electrodes is deposited and then patterned to form a data line 600 including source and drain electrodes 600a and 600b, constituting a TFT T as a switching device. Here, the drain electrode 600b is configured to overlap a portion of the transparent pixel electrode 400 and electrically connected thereto.

Figure 3E:
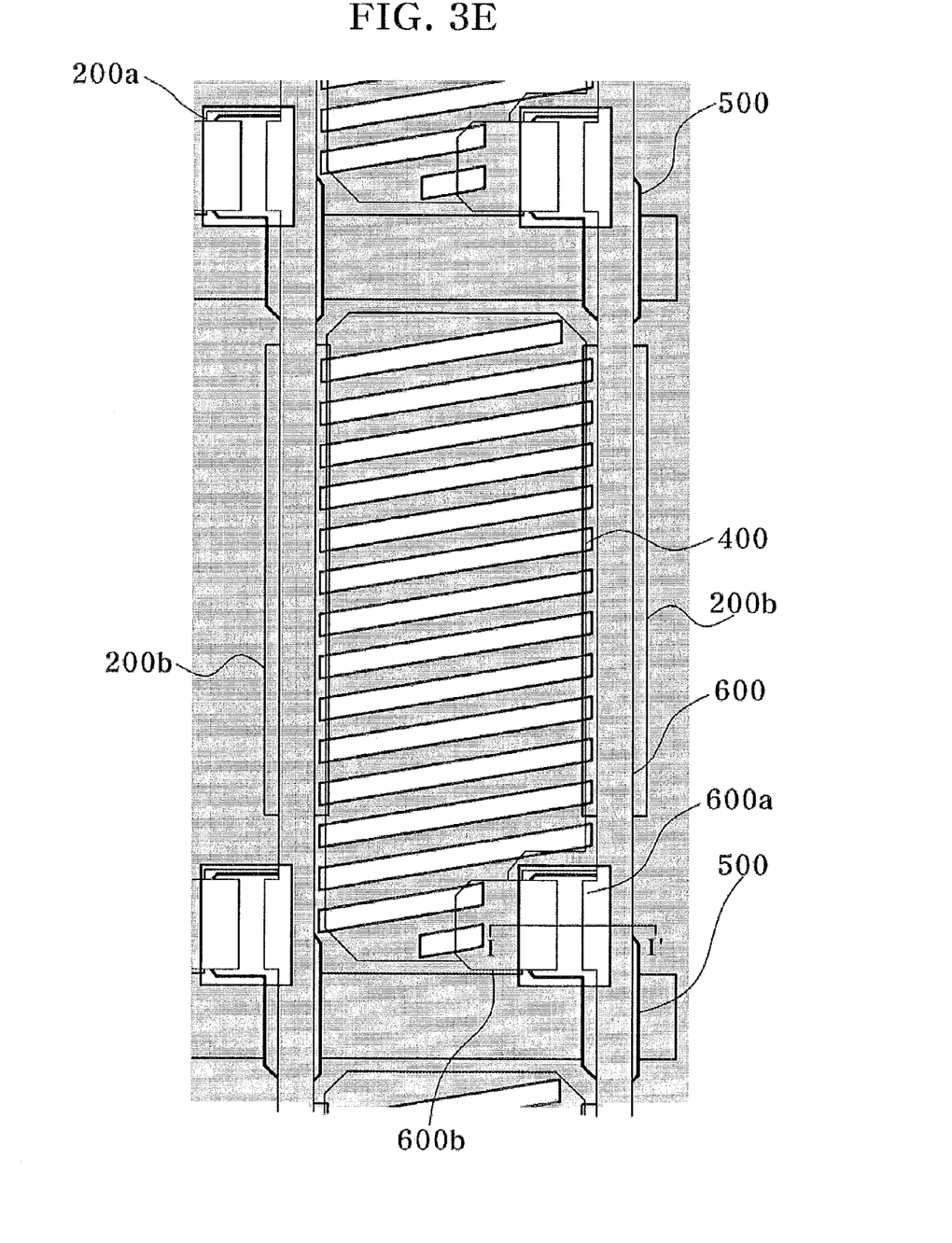

Next, an insulating layer 700 formed of a SiNx material is applied on the resultant structure having the TFT T, and then, a transparent common electrode 800 having slits is formed to overlap at least a portion of the transparent pixel electrode 400. The transparent common electrode 800 has a plurality of slits formed in the pixel region, and opens at least a portion of the TFT T.

Next, while not shown, an alignment layer is applied on the uppermost layer of the resultant substrate, on which the transparent common electrode 800 is formed, to complete manufacture of an array substrate. Meanwhile, a color filter is selectively formed on the upper substrate, and an alignment layer is formed thereon. The upper substrate and lower substrate 100 are bonded to each other with a liquid crystal layer interposed therebetween to complete manufacture of the FFS mode LCD in accordance with an exemplary embodiment of the present invention. Of course, after bonding of the substrates, polarizers may be attached to outer surfaces of the substrates.

Hereinafter, effects of the present invention will be described in detail in comparison with a conventional LCD.

Figure 4:
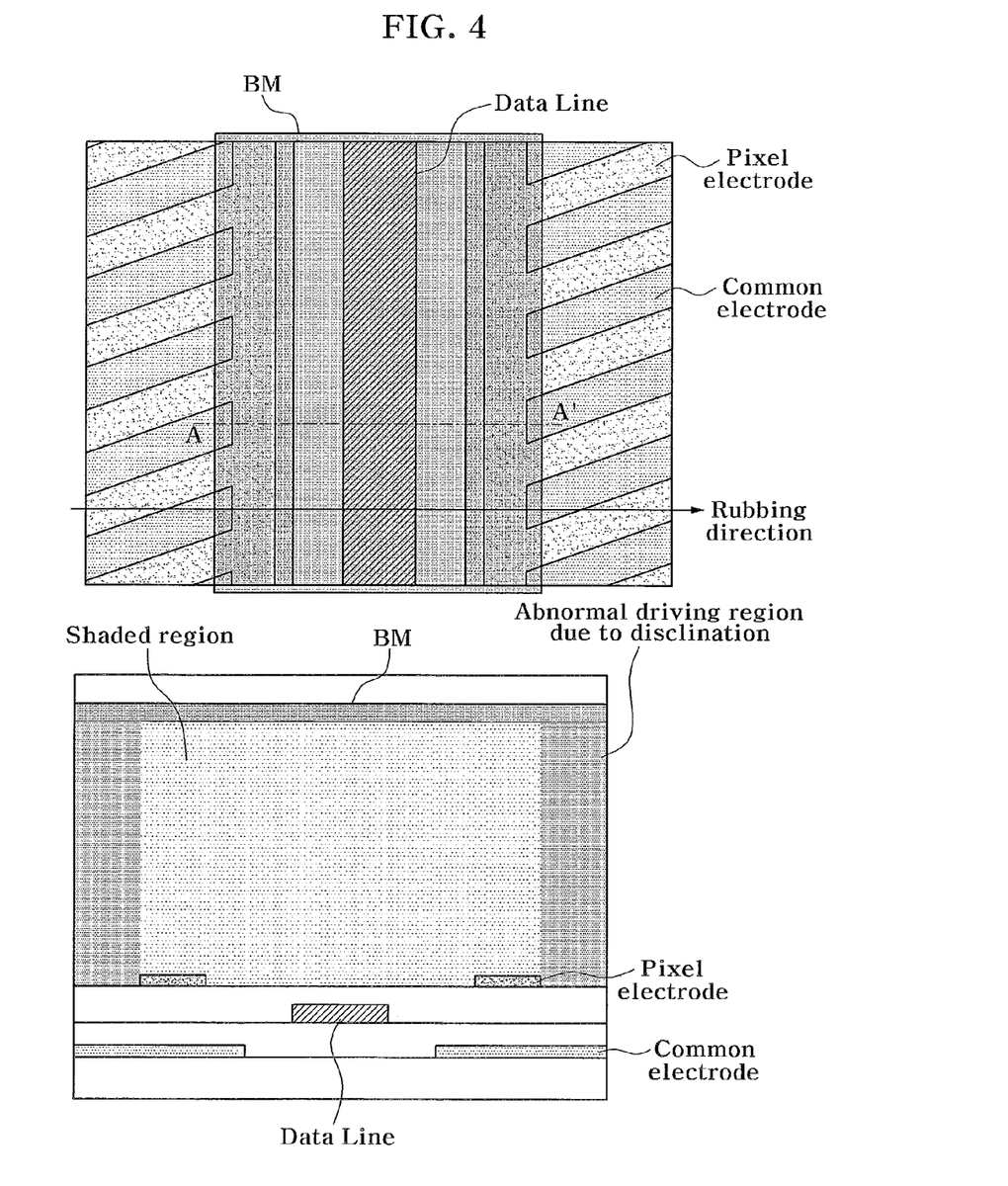
FIGS. 4 to 6 are plan views and cross-sectional views showing comparison of effects between Korean Patent Registration Nos. 653474 and 849599 and an exemplary embodiment of the present invention.
Figure 5:
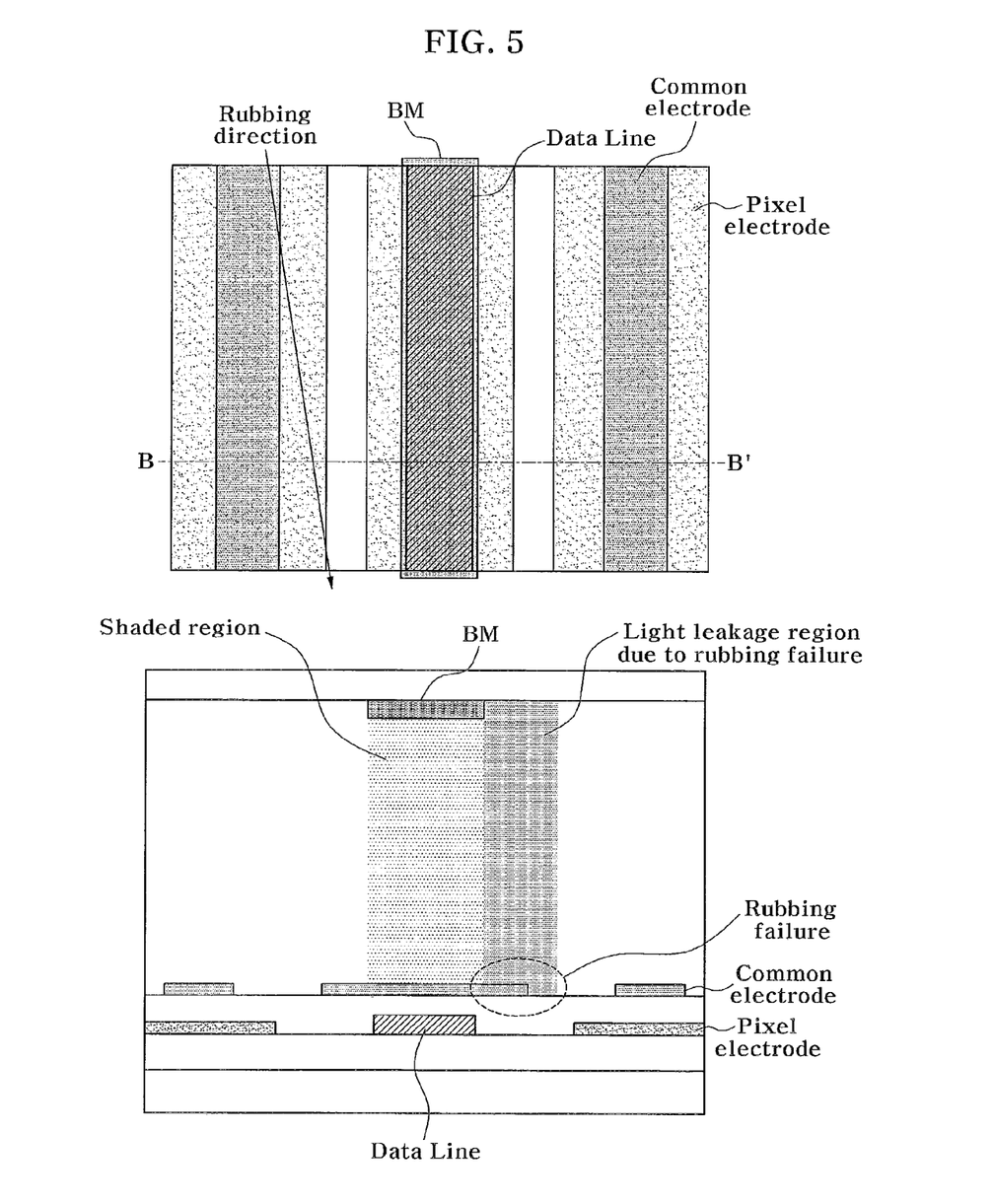
Figure 6:
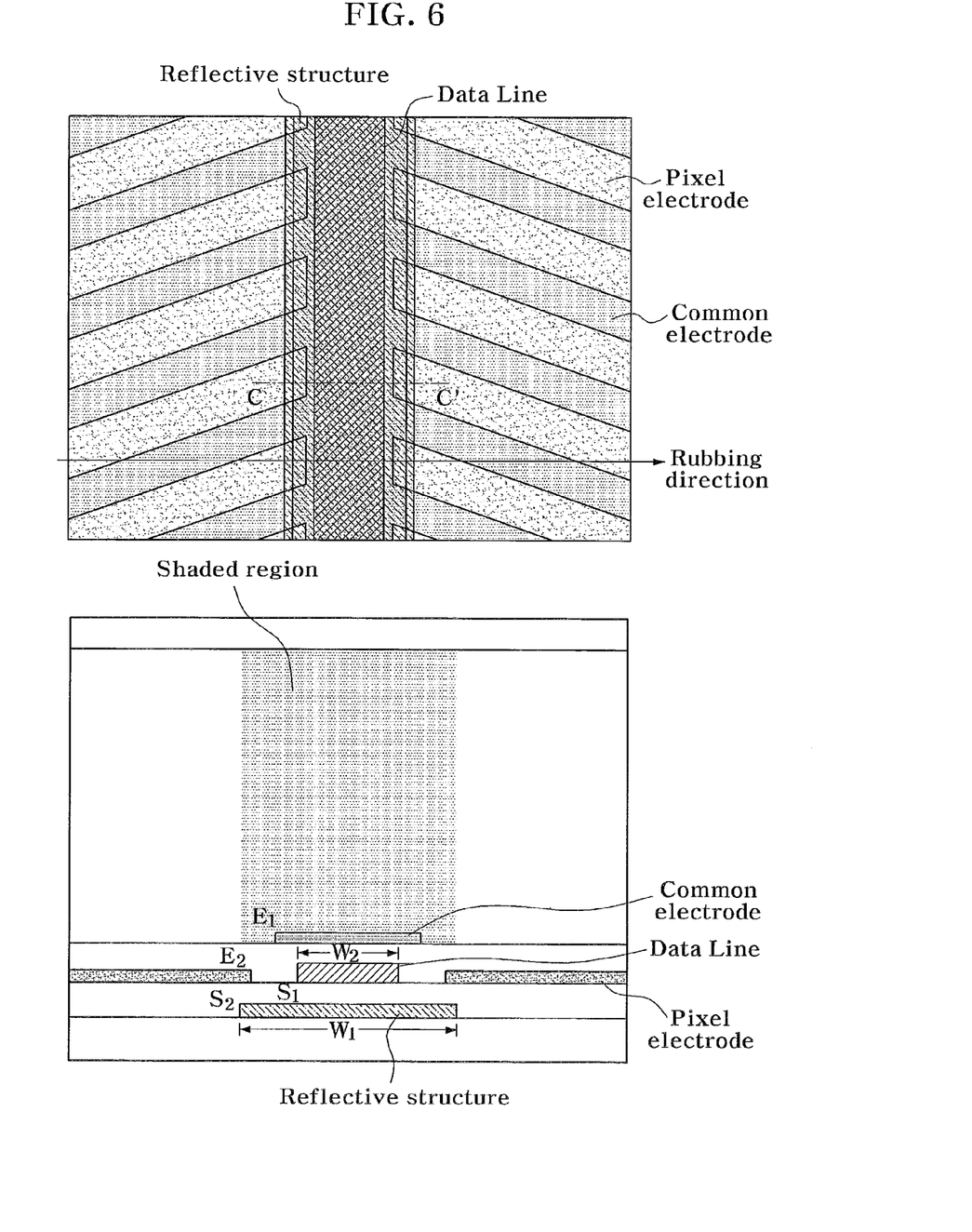
Figure 7:
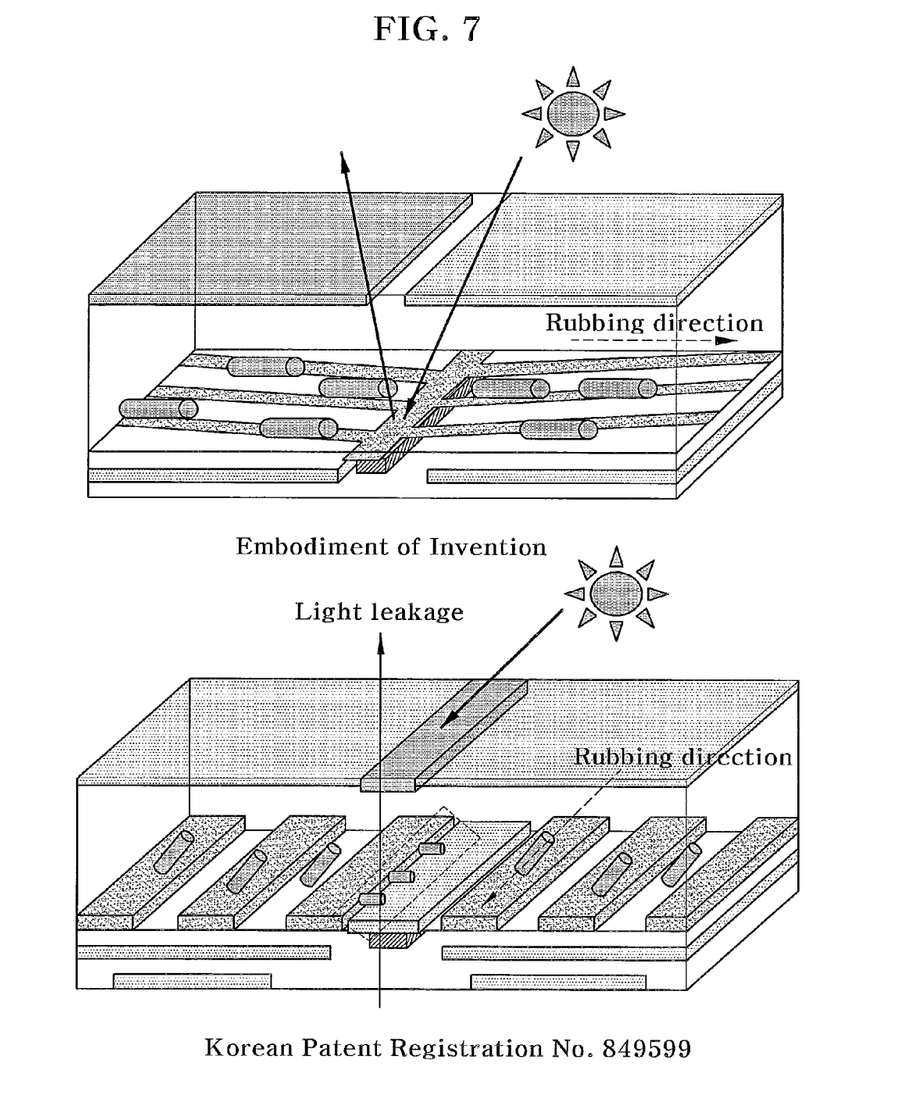
FIG. 7 is a perspective view showing comparison of internal reflection and light leakage prevention effects of LCD between Korean Patent Registration No. 849599 and an exemplary embodiment of the present invention.

FIGS. 4 to 6 are plan views and cross-sectional views showing comparison of effects between Korean Patent Registration Nos. 653474 and 849599 and an exemplary embodiment of the present invention, explaining effects such as improvement in internal reflection of light around a data line, prevention of light leakage, prevention of disclination, etc., of the LED in accordance with the present invention. FIG. 7 is a perspective view showing comparison of internal reflection and light leakage prevention effects of LCDs between Korean Patent Registration No. 849599 and an exemplary embodiment of the present invention.

The exemplary embodiment of the present invention is provided to induce internal reflection of the unit pixel region to increase external visibility.

In this exemplary embodiment, in addition to the data line, a reflective structure is formed under the data line using a gate line material, and thus, reflection by the gate line is also possible. That is, since light cannot pass through the reflective structure by reflection upon internal driving, the reflective structure functions as a black matrix BM. In addition, upon external driving, external light is reflected by metals of the data line, the gate line, the reflective structure, etc., to increase external visibility.

Referring to FIGS. 4 to 6, FIG. 4 shows that a black matrix formed on a data line in a structure of Korean Patent Registration No. 653474 may cause a dark region, which is non-driven, and a disclination region, which is abnormally driven. In FIG. 5, it will be appreciated that a region in which a black matrix is partially formed exists in Korean Patent Registration No. 849599, and light leakage may occur due to rubbing failures.

On the other hand, in FIG. 6, the reflective structure is installed under the data line, and the black matrix BM is not formed on the upper substrate or partially formed on a formation region of the TFT only, improving an aperture ratio and maximizing internal reflection.

In addition, a rubbing direction is set to a substantially 0° with respect to the gate line to align liquid crystals in a horizontal direction so that the alignment direction is substantially perpendicular to a direction of the data line, and the alignment direction of the liquid crystals is disposed to form an angle of 0 or 90° with respect to transmittance axes of polarizers of the upper and lower substrates. As a result, a major axis of the liquid crystal on one side of the data line, in which rubbing treatment may not be appropriately performed, coincides with a transmittance axes or absorption axes of the polarizers of the upper and lower substrates, preventing light leakage from a corresponding region.

Meanwhile, the reflective structure may have a width $W_1$ larger than a width $W_2$ of the data line, making it possible to prevent colors between adjacent pixels from mixing and further increase internal reflection.

Further, each distal end $E_1$ of the slits of the transparent common electrode is disposed between one end $S_1$ of the data line adjacent to the distal end $E_1$ and one end $S_2$ of the reflective structure. As a result, the disclination region of the end of the slit can be shaded.

Furthermore, a distal end $E_2$ of the transparent pixel electrode may be disposed between one end $S_2$ of the reflective structure and one end $S_1$ of the data line. In order to prevent light from leaking through a common electrode slit between the transparent pixel electrode and the reflective structure, the transparent pixel electrode and the reflective structure may partially overlap each other. However, since the data line and the pixel electrode are formed on the same layer, which may cause a short circuit during the process, the data line and the pixel electrode may be spaced apart a predetermined distance from each other.

Figure 8:
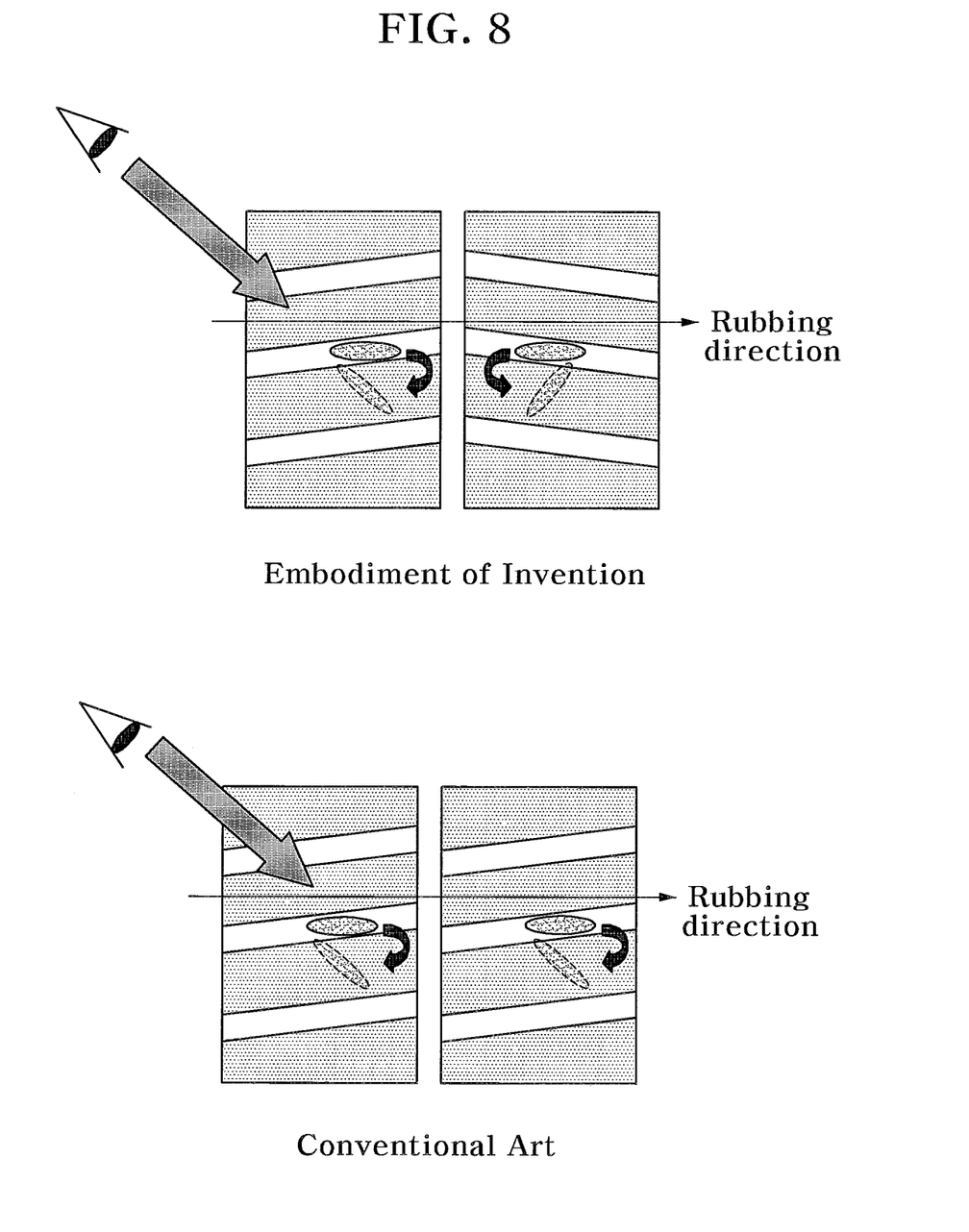
FIGS. 8 and 9 show other exemplary embodiments of the present invention.

FIG. 8 shows another exemplary embodiment of the present invention. Referring to FIG. 8, slits of the transparent common electrode have angles such that adjacent pixel regions are axisymmetrically disposed. According to the above constitution, rotational directions of the adjacent pixels may be opposite to each other upon driving of the liquid crystals. That is, when angles of the slits of the transparent common electrodes of one pixel and an adjacent pixel are symmetrically disposed with respect to the gate line or the data line and liquid crystals are rotated clockwise upon driving, liquid crystals of the adjacent pixel are rotated counter-clockwise to compensate a refractive index according to a viewing angle, preventing color shift.

Figure 9:
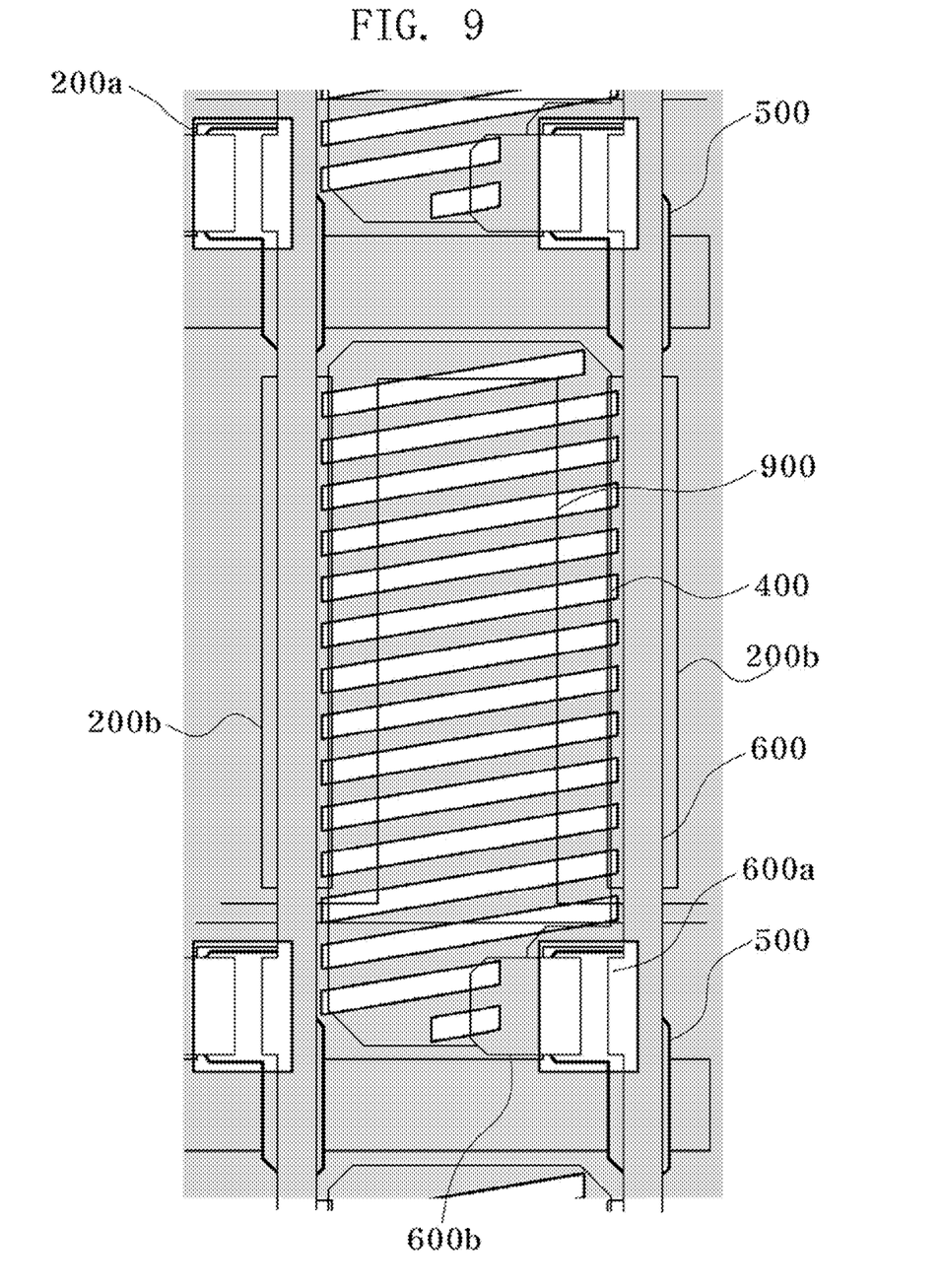

FIG. 9 shows another exemplary embodiment of the present invention.

FIG. 9 shows a method in which a separate process is added to an LCD of FIG. 1. For the convenience of description, only a difference from the LCD of FIG. 1 will be described.

Referring to FIG. 9, a transparent auxiliary electrode 900 is additionally formed under the transparent pixel electrode 400. The transparent auxiliary electrode 900 is formed in the pixel region using a transparent conductive layer after formation of the gate line 200a and the reflective structure 200b so that adjacent pixel regions in the gate line direction are electrically connected to each other. Next, processes after FIG. 3B (a series of processes such as formation of a gate insulating layer, formation of an active layer, formation of a transparent pixel electrode, formation of a data line, formation of a protective layer, formation of a transparent common electrode, etc.) are performed. Meanwhile, the transparent auxiliary electrode 900 may have a size included in the transparent pixel electrode 400. The transparent auxiliary electrode 900 functions to increase a storage capacitance.

The function of the transparent auxiliary electrode 900 is to maintain or increase the entire storage capacitance and effectively improve image quality by adjusting an auxiliary storage capacitance by the transparent auxiliary electrode 900 according to variation in pixel size due to high resolution and variation in conventional storage capacitance of each pixel.

As can be seen from the foregoing, a contact hole in a pixel region can be removed to implement high resolution.

In addition, since reflection by a metal material of a data line and a gate line can be used, external visibility can be increased.

Further, since a rubbing process is performed at an angle of °0 or substantially 0° with respect to the gate line, it is possible to prevent light leakage of the data line of the conventional art.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A fringe field switching mode (FFS mode) liquid crystal display device (LCD) including a lower substrate, an upper substrate, and a liquid crystal layer disposed between the substrates, the lower substrate including unit pixel regions defined by gate lines and data lines formed to intersect each other and switching devices disposed on intersections of the gate and data lines, the LCD comprising:
   a transparent pixel electrode disposed in the pixel region;
   a transparent common electrode disposed on the transparent pixel electrode and spaced apart from the transparent pixel electrode with an insulating layer interposed therebetween, and having a plurality of slits formed in the pixel region, to adjust optical transmittance by applying a voltage to the liquid crystal layer, and
   a reflective structure formed of the same material as the gate line and disposed under the data line with an insulating layer disposed therebetween,
   wherein the slits are regions where the transparent common electrode is not formed, and disposed to form an angle of 5 to 10° with respect to the gate line, a rubbing direction for an initial alignment direction of the liquid crystal layer is substantially parallel to a gate direction, a drain electrode of the switching device is electrically connected to the transparent pixel electrode, and a portion of the drain electrode is formed immediately above a portion of the transparent pixel electrode,
   the reflective structure has a width larger than that of the data line, and
   boundaries between the transparent common electrode that covers the data line and the slits are disposed between one end of the data line adjacent to the boundaries and one end of the reflective structure adjacent to the boundaries.

2. The LCD according to claim 1, wherein a distal end of the transparent pixel electrode is disposed between one end of the data line adjacent to the distal end of the transparent pixel electrode and one end of the reflective structure.

3. The LCD according to claim 1, wherein the angle of the slits is determined such that adjacent pixel regions are axisymmetrically disposed to differentiate rotational directions upon driving of liquid crystals.

4. The LCD according to claim 1, further comprising a transparent auxiliary electrode formed under the transparent pixel electrode.

5. The LCD according to claim 1, the transparent common electrode open at least a portion of the switching device.

6. A method of fabricating a fringe field switching mode (FFS mode) liquid crystal display device (LCD) including a lower substrate, an upper substrate, and a liquid crystal layer disposed between the substrates, the lower substrate including unit pixel regions defined by gate lines and data lines formed to intersect each other and switching devices disposed on intersections of the gate and data lines, the method comprising:
   forming a gate line;
   forming a gate insulating layer and an active layer on the gate line;
   forming a transparent pixel electrode in the pixel region;
   forming a drain electrode and a data line on the resultant structure having the transparent pixel electrode, wherein a portion of the drain electrode is electrically connected to a portion of the pixel electrode; and
   forming a transparent common electrode disposed on and spaced apart from the transparent pixel electrode with an insulating layer interposed therebetween, having a plurality of slits in the pixel region, and configured to open at least a portion of the switching device,
   wherein a reflective structure is formed under a region, in which the data line is to be formed, when the gate line is formed, the reflective structure has a width larger than that of the data line, the slits are regions where the transparent common electrode is not formed, and boundaries between the transparent common electrode that covers the data line and the slits are disposed between one end of the data line adjacent to the boundaries and one end of the reflective structure adjacent to the boundaries.

7. The method according to claim 6, wherein the slits are disposed to form an angle of 5 to 10° with respect to the gate line, and a rubbing direction for an initial alignment direction of the liquid crystal layer is substantially parallel to a gate direction.

8. The method according to claim 6, wherein a distal end of the transparent pixel electrode is disposed between one end of the reflective structure and one end of the data line.

9. The method according to claim 6, wherein the angle of the slits is determined such that adjacent pixel regions are axisymmetrically disposed to differentiate rotational directions upon driving of liquid crystals.

10. The method according to claim 6, further comprising forming a transparent auxiliary electrode under the transparent pixel electrode.

* * * * *